United States Patent
Hampo et al.

(10) Patent No.: US 9,065,327 B2
(45) Date of Patent: Jun. 23, 2015

(54) EFFICIENCY OPTIMIZED POWER CONVERTER WITH DUAL VOLTAGE POWER FACTOR CORRECTION

(75) Inventors: Richard J. Hampo, Plymouth, MI (US); Xiangchun Wu, Farmington Hills, MI (US)

(73) Assignee: Lear Corporation, Southfield, MI (US)

(*) Notice: Subject to any disclaimer, the term of this patent is extended or adjusted under 35 U.S.C. 154(b) by 202 days.

(21) Appl. No.: 13/022,756

(22) Filed: Feb. 8, 2011

(65) Prior Publication Data
US 2012/0201061 A1    Aug. 9, 2012

(51) Int. Cl.
 H02M 1/42    (2007.01)
 H02M 1/10    (2006.01)

(52) U.S. Cl.
 CPC .......... *H02M 1/10* (2013.01); *Y02B 70/126* (2013.01); *H02M 1/4225* (2013.01)

(58) Field of Classification Search
 CPC .. H02M 2001/42; H02M 1/42; H02M 1/4258
 USPC ......... 323/299, 300, 205, 207, 282, 283, 284, 323/285, 222, 224, 225, 266, 297, 298, 293, 323/351, 352, 353, 354; 363/89, 84, 86
 See application file for complete search history.

(56) References Cited

U.S. PATENT DOCUMENTS

| | | | |
|---|---|---|---|
| 5,910,891 A * | 6/1999 | Jo | .................................. 363/89 |
| 6,392,856 B1 | 5/2002 | Kehrli et al. | |
| 6,686,725 B1 * | 2/2004 | Choi et al. | .................... 323/207 |
| 6,750,636 B2 | 6/2004 | Hocken et al. | |
| 7,616,455 B2 | 11/2009 | Cameron et al. | |
| 8,324,871 B2 * | 12/2012 | Tsai et al. | ..................... 323/207 |
| 2002/0101743 A1 | 8/2002 | Kallus et al. | |
| 2009/0206780 A1 | 8/2009 | Hexamer | |
| 2009/0244944 A1 | 10/2009 | Jang et al. | |
| 2009/0316454 A1 | 12/2009 | Colbeck et al. | |
| 2010/0080026 A1 | 4/2010 | Zhang | |
| 2010/0204871 A1 | 8/2010 | Bange et al. | |
| 2010/0253295 A1 | 10/2010 | Tan et al. | |
| 2010/0259227 A1 * | 10/2010 | Gale et al. | ..................... 320/162 |
| 2010/0259240 A1 | 10/2010 | Cuk | |
| 2011/0096242 A1 * | 4/2011 | Joo et al. | ....................... 348/730 |
| 2012/0092900 A1 * | 4/2012 | Orr | ........................... 363/21.03 |

FOREIGN PATENT DOCUMENTS

EP     2047287 A1    4/2009

* cited by examiner

*Primary Examiner* — Gary L Laxton
(74) *Attorney, Agent, or Firm* — Brooks Kushman P.C.

(57) ABSTRACT

A dual voltage power conversion system with power factor correction (PFC) having a capabilities to adjust a PFC setpoint according to operating conditions. The input signaling levels, for example, may be monitored and used to control adjustments to the PFC setpoint in order to allow the PFC setpoint to dynamically change with any input variation. The PFC setpoint may be adjusted to a PFC setpoint resulting in maximum efficiency.

14 Claims, 1 Drawing Sheet

EFFICIENCY OPTIMIZED POWER CONVERTER WITH DUAL VOLTAGE POWER FACTOR CORRECTION

TECHNICAL FIELD

The present invention relates to power converters having power factor correction, such as but not limited to converters of the type suitable for use within a vehicle to facilitate battery charging with energy sourced from a utility power grid.

BACKGROUND

Power factor correction (PFC) defines a consumption ratio of real power to apparent power and is typically reflected with a value between 0-1. PFC can be used to facilitate maximizing real power drawn from an AC power grid or other AC source to power a load by controlling the AC current to match as closely as possible to the shape and phase of the corresponding AC voltage. The load is more efficiently consuming power when the AC current and AC voltage are more closely matched, i.e., the closer the PFC value is to 1.

SUMMARY

One non-limiting aspect of the present invention relates to an efficiency optimized power converter with dual voltage power factor correction (PFC). The converter may include a rectifier circuit operable to rectify an AC input to a first DC output; a boost circuit operable to boost the first DC output to one of a second DC output and a third DC output; and a controller operable to control the boost circuit to output the one of the second DC output and the third DC output with PFC, the controller controlling the boost circuit to output the second DC output when the AC input is less than a threshold and to output the third DC output when the AC input is greater than or equal to the threshold.

The controller may control PFC of the boost circuit at least in part as a function of a voltage sensed at an output node of the boost circuit.

The controller may manipulate the voltage sensed at the output node with control of a voltage divider circuit connected to the output node.

The controller may set the voltage divider circuit to a first resistance in the event the AC input is less than the threshold and to a second resistance in the event the AC input is greater than or equal to the threshold.

The voltage divider circuit may include a first switch connected in series between the output node and a first resistor, the controller closing the first switch to set the voltage divider circuit to the first resistance and opening the first switching to set the voltage divider circuit to the second resistance.

The boost circuit may be configured as a boost converter having: an inductor, diode and capacitor connected in series; second and third resistors connected in parallel with the capacitor; a second switch connected between the inductor and diode and in parallel with the capacitor, the second switch being controlled by the controller to perform switching required to generate the second and third DC outputs with PFC; and wherein the first switch connects the first resistor in parallel with the third resistor.

The rectifier circuit may be a bridge rectifier comprised of four diodes connected to a receptacle used by a cordset that connects to a utility power grid to receive the AC input, and wherein each of the controller, rectifier, and boost circuit are included within a housing secured within a vehicle.

One non-limiting aspect of the present invention relates to a system for dual voltage power conversion comprising: a boost circuit operable to convert a first DC input to one of a second DC output and a third DC output; a voltage scaling circuit connected to the boost circuit and operable to set a power factor correction (PFC) setpoint for use in controlling the boost circuit, the voltage scaling circuit being operable to a first state and a second state, the first state setting the PFC setpoint to a first value and the second state setting the PFC setpoint to a second value; and a controller operable to control the boost circuit to output the one of the second DC output and the third DC output with PFC managed based at least in part on the PFC setpoint, the controller setting the PFC setpoint to the first value when the second DC output is desired and to the second value when the third DC output is desired.

The first DC input may result from conversion of an AC input and wherein the controller is sets the PFC setpoint to the one of the first value when the AC input is less than a threshold and to the second value when the AC input is greater than or equal to the threshold.

The system may include a rectifier operable to perform the conversion of the AC input to the first DC input.

The controller may continuously adjust a duty cycle of a signal used to control the boost circuit based on the AC input and the PFC setpoint.

The system may include a first switch operable between an open position and a closed position in response to a signal from the controller, the open position connecting a first resistor to the voltage scaling circuit and the closed position disconnecting the resistor from the voltage scaling circuit, the voltage scaling circuit having the first state when the switch is in the closed position and the second state when the switch is in the open position.

The boost circuit may be configured as a boost converter having: an inductor, diode and capacitor connected in series; second and third resistors connected in parallel with the capacitor; a second switch connected between the inductor and diode and in parallel with the capacitor, the second switch being controlled by the controller to perform switching required to generate the second and third DC outputs with PFC; and wherein the first switch connects the first resistor in parallel with the third resistor.

The controller may set as duty cycle of the second switch based on an AC input from which the first DC inputs is generated and the PFC setpoint.

One non-limiting aspect of the present invention relates to a method of controlling a dual voltage power conversion system having a boost circuit and a voltage scaling circuit, the boost circuit operable to convert a first DC input to one of a second DC output and a third DC output, and the voltage scaling circuit operable to a first state to set a first voltage scale value and a second state to set a second voltage scale value, the method comprising: setting the voltage scale to the first value when the second DC output is desired and to the second value when the third DC output is desired; and controlling the boost circuit to output the one of the second DC output and the third DC output with PFC managed based at least in part on the set voltage scale.

The method may further include setting the voltage scale based on an AC input being converted to the first DC input.

The method may further include setting a duty cycle of a signal used to control the boost circuit based on the AC input and the voltage scale.

The method may further include setting the voltage scale by issuing a signal to one of open and close a switch used to connected a resistive element to the voltage scaling circuit, connection of the resistive element controlling whether the voltage scaling circuit is in the first state and the second state.

The method may further include closing the switch when an AC input rectified to the first DC input is less than a threshold.

The method may further include opening the switch when an AC input rectified to the first DC input greater than or equal to than the threshold.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
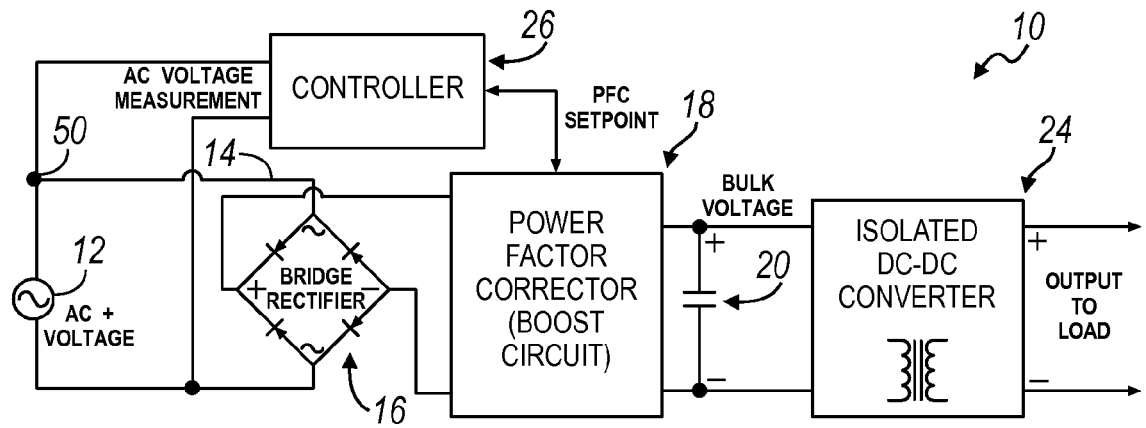
FIG. 1 illustrates an efficiency optimized power converter system with dual voltage power factor correction (PFC) in accordance with one non-limiting aspect of the present invention.

FIG. 1 illustrates an efficiency optimized power converter system 10 with dual voltage power factor correction (PFC) in accordance with one non-limiting aspect of the present invention. The system 10 is described with respect to being a vehicle-mounted type unit having a housing (not shown) secured within a vehicle (not shown) and a receptacle connection (not shown) suitable for operatively connecting to a utility power grid 12 by way of a cordset or suitable connection 14, such as to facilitate charging of a high voltage battery or other load included within an electric or hybrid electric vehicle with DC energy generated from utility grid supplied AC energy 12. This exemplary illustration, however, is not intended to unnecessarily limit the scope of the present invention as the present invention fully contemplates its use in other non-vehicle or non-automotive environments where it may be desirable to support PFC for linear or non-linear loads in order to maximize the efficiency at which supplied energy is consumed.

The AC energy received at the receptacle 14 is shown to be rectified with a rectifier circuit 16. The rectifier circuit 16 may be a diode bridge comprised of four diodes or some other suitable AC-DC inverter. The DC output of the rectifier 16 is shown as a DC input to a PFC circuit 18, which for exemplary and non-limiting purposes is labeled and described to be a boost circuit as one aspect of the present invention contemplates boosting to the DC output of the rectifier 16 to support high voltage operations, however, the present invention fully contemplates other configuration for providing PFC instead of a boost circuit 18, such as buck, buck/boost, sepic, or any other DC-DC circuit topology. A bulk capacitor or capacitor bank 20 may be included to smooth the DC output of the PFC circuit 18 prior to a DC-DC converter 24 finally manipulation the DC signals for output to the desired load. The bulk capacitor 20 may be useful in smoothing the output of the PFC circuit 18 and the DC-DC converter 24 may be useful in isolating the load and/or otherwise further processing and controlling the output to the load, which may even include inverting the received DC signal to an AC signal.

The controlling necessary to support the operation of the system 10 may be provided with a controller 26. The controller 26 may be configured to measure or receive a measurement of the AC signal received at the rectifier 16 and to control the PFC circuit 18 as a function thereof, such as to control switching and/or other operations required of the boost circuit 18 or other circuit being used to process the DC output of the rectifier 16. The controller 26 may also be configured to utilize a voltage measured at an measurement node 28 (see FIG. 2) of the PFC circuit 18 as feedback for use in controlling the PFC and/or boosting provided by the PFC circuit 18. This voltage measurement, at least with respect to its use in facilitating PFC, may be referred to as a voltage scale or PFC setpoint in that the controller 26 may be configured to adjust the PFC operations used to facilitate aligning the AC current with the AC voltage as function of the PFC setpoint.

One non-limiting aspect of the present invention contemplates controlling the PFC setpoint used by the controller 26 to facilitate dual voltage PFC, i.e., supporting PFC while the system 10 outputs at different voltage levels. This capability may be useful in allowing the system to maximize efficiency at two or more voltage levels (e.g., a unique setpoint may be generated for each desired voltage level).

One non-limiting aspect of the present invention contemplates the system 10 being required to support operations for AC voltage inputs of between 265 VAC and 305 VAC, although these values may vary depending on the particular use of the system 10. Since the controller 26 may require the PFC setpoint to be set to a voltage level associated with the greatest supported AC voltage input, i.e., 305 VAC. In the absence of the PFC setpoint manipulation contemplated by the present invention, the PFC at lower voltage levels would be less efficient if controlled according to the 305 VAC setpoint (455 VDC), which is undesirable, especially in the event the lower voltage levels are associated with more typical or normal operating conditions, i.e., less than 265 VAC.

Figure 2:
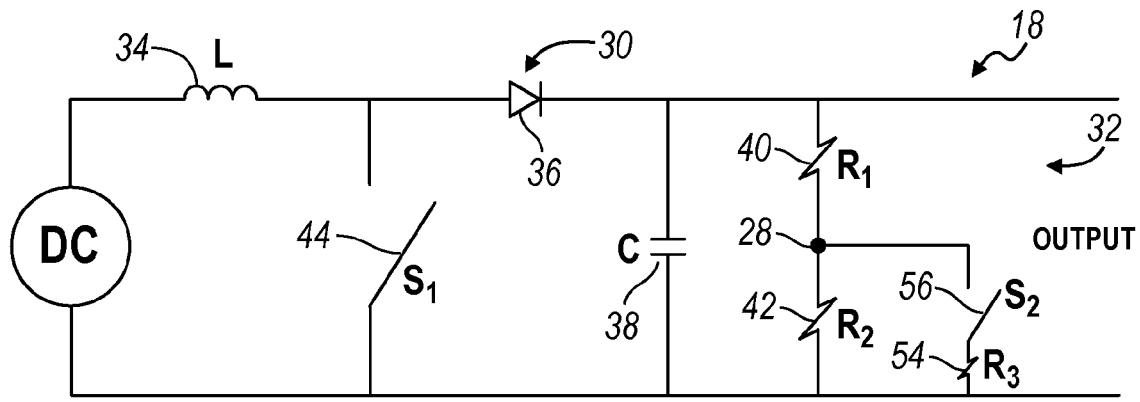
FIG. 2 illustrates a PFC circuit contemplated by one non-limiting aspect of the present invention to facilitate dual voltage PFC.

The present invention allows one PFC setpoint (400 VDC) to be generated during normal operating conditions of less than 265 VAC and another, different setpoint (455 VDC) to be generated when operating at greater operating conditions of 265 VAC to 305 VAC. This allows the present invention to facilitate dual voltage PFC while maximizing efficiency at both operating conditions. FIG. 2 illustrates the PFC circuit 18 contemplated by one non-limiting aspect of the present invention to facilitate dual voltage PFC. The circuit 18 is shown with respect to the exemplary boost configuration and without intending to unnecessarily limit the scope and contemplation of the present invention.

The PFC circuit 18 may be comprised of a boost portion 30 and a voltage divider or voltage scaling circuit 32. The PFC circuit 18 may include an inductor 34, diode 36 and capacitor 38 connected in series, first and second resistors 40, 42 connected in parallel with the capacitor 38, and a first switch 44 connected between the inductor 34 and diode 36 and in parallel with the capacitor 38. The controller 26 may be operable to control the first switch 44 to perform switching required to generate the DC output with PFC. The controller 26 may rely on a voltage sensed at an output node 50 (see FIG. 1) to control the switching operations and PFC, which may be set with the voltage divider circuit 32.

The voltage divider circuit 32 is shown as a resistive configuration where first, second, and third resistors 40, 42, 54 are arranged into a dividing configuration where a second switch 56 controls the division of the resistance set by the first and second resistors 40, 42 with controllable connection of the third resistor 54. The controller 26 may control opening and closing of the second switch 56 in order to vary the voltage sensed at the measurement node 28, i.e., the PFC setpoint, in order to adapt PFC according to desired operating conditions.

One non-limiting aspect of the present invention contemplates the controller 26 measuring or otherwise determining the AC input voltage to the rectifier 16 and controlling actuation of the switch 56 as a function thereof, i.e. closing the switch 56 to generate a lower voltage PFC setpoint (e.g., 400 VDC to support less than 265 VAC input) and opening the switch to generate a greater voltage PFC setpoint (e.g., 430 VDC to support 265 VAC to 305 VAC input). While the resistive configuration 32 is shown for exemplary purposes, the present invention fully contemplates the use of other configuration and non-resistive configurations suitable to altering the PFC setpoint as a function of signal received from the controller 26 or signaling otherwise varying depending on one or more operating conditions, such as the above described AC input.

Figure 3:
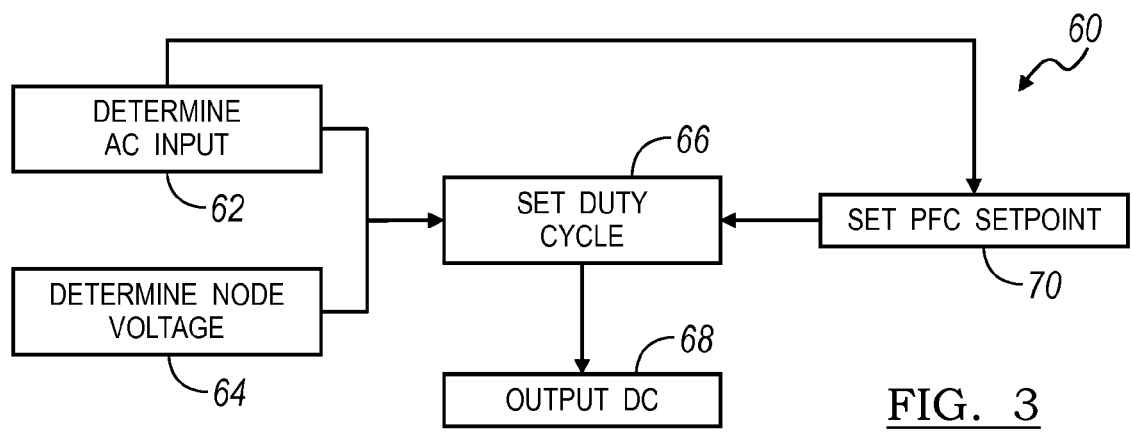
FIG. 3 illustrates a flowchart for a method of dual voltage power conversion with PFC in accordance with one non-limiting aspect of the present invention.

FIG. 3 illustrates a flowchart 60 for a method of dual voltage power conversion with PFC in accordance with one non-limiting aspect of the present invention. The method and/or processes associated therewith may be implemented with instructions or other operations implemented by a processor, such as one within the controller 26, executing according to instructions or code stored on a computer-readable medium. The method contemplates the controller 26 essentially simultaneously, if possible, processing the present AC input 50 to the system 10 (see block 62) with the present DC voltage 28 at the output node (see block 64) for use in setting a duty cycle for the first switch (see block 66) that then results in the PFC circuit 18 providing one of a second DC voltage (400 VDC) or third DC output (455 VDC) in block 68. In parallel therewith, the controller 26 may also control the second switch 56 (see block 70) between the open and closed state depending on the AC voltage is above a threshold corresponding with the lower PFC setpoint, i.e., the switch is opened when the greater PFC setpoint is needed due to the AC input voltage being greater than 265 VAC.

As supported above, one non-limiting aspect of the present invention contemplates PFC to maximize real power to be drawn from an AC grid by controlling an input AC current to be approximately the same shape and phase as the AC voltage. The contemplated circuit topology may be a boost converter although other converters and circuits may be used. For boost converters, the output voltage must be strictly larger than the input voltage, requiring the PFC output voltage to set at 400 VDC when operating from AC voltages up to 265 VAC (which has instantaneous peak voltage of 375 VDC=265*sqrt (2)). Subsequent power conversion stages may be implemented to provide an isolated, controlled output. In order to support a wider input range, for example 305 VAC, the peak voltage is 430 VDC, which requires more than the normal PFC setpoint of 400 VDC. Rather than permanently set the PFC to 450 VDC to accommodate the occasional use of 305 VAC input and cause the efficiency of the device to suffer due to the increase of power device switching losses at the higher system voltage, this invention provides a nominal PFC setpoint of 400 VDC, which is optimized for operation with AC voltages up to 265 VAC and another mode which switches the PFC setpoint to 455 VAC for use with AC input voltages of between 265 and 305 VAC. This is done by changing the voltage scaling on the AC and DC voltage measurements used by the PFC controller.

The advantages of this invention may include, at least in some aspects, a wider input voltage range, improved efficiency over single PFC setpoint systems, simple and robust implementation of setpoint switching via mosfet transistor and resistor combination While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An efficiency optimized power converter with dual voltage power factor correction (PFC) comprising:
   a rectifier circuit operable to rectify an AC input to a rectified DC output;
   a boost circuit operable to boost the rectified DC output to one of a second DC output and a third DC output; and
   a processor operable to receive a direct measurement of the AC input prior to rectification and a DC voltage sensed from an output node of the boost circuit, and to process the received AC input and the received DC voltage to control PFC, the processor further operable to control the boost circuit to output the second DC output when the measured AC input is less than a threshold and to output the third DC output when the measured AC input is greater than or equal to the threshold;
   wherein the processor manipulates the voltage sensed at the output node with control of a voltage divider circuit connected to the output node.

2. The converter of claim 1 wherein the processor sets the voltage divider circuit to a first resistance in the event the AC input is less than the threshold and to a second resistance in the event the AC input is greater than or equal to the threshold.

3. The converter of claim 2 wherein the voltage divider circuit includes a first switch connected in series between the output node and a first resistor, the processor closing the first switch to set the voltage divider circuit to the first resistance and opening the first switch to set the voltage divider circuit to the second resistance.

4. The converter of claim 3 wherein the boost circuit is configured as a boost converter having:
   an inductor, diode and capacitor connected in series;
   second and third resistors connected in parallel with the capacitor;
   a second switch connected between the inductor and diode and in parallel with the capacitor, the second switch being controlled by the processor to perform switching required to generate the second and third DC outputs with PFC; and
   wherein the first switch connects the first resistor in parallel with the third resistor.

5. The converter of claim 1 wherein the rectifier circuit is a bridge rectifier comprised of four diodes, the diodes being connected to a receptacle used by a cordset that connects to a utility power grid to receive the AC input, and wherein each of the processor, rectifier, and boost circuit are included within a housing secured within a vehicle.

6. A system for dual voltage power conversion comprising:
a boost circuit operable to convert a first DC input to one of a second DC output and a third DC output, wherein the first DC input results from a conversion of an AC input;
a voltage scaling circuit connected to the boost circuit and operable to set a power factor correction (PFC) setpoint for use in controlling the boost circuit, the voltage scaling circuit being operable to a first state and a second state, the first state setting the PFC setpoint to a first value and the second state setting the PFC setpoint to a second value;
a processor operable to control the boost circuit to output the one of the second DC output and the third DC output with PFC managed based at least in part on the PFC setpoint, the processor setting the PFC setpoint to the first value when the second DC output is desired and to the second value when the third DC output is desired; and
a first switch operable between an open position and a closed position in response to a signal from the processor, the closed position connecting a first resistor to the voltage scaling circuit and the open position disconnecting the first resistor from the voltage scaling circuit, the voltage scaling circuit having the first state when the first switch is in the closed position and the second state when the switch is in the open position;
wherein the processor is operable to receive a direct measurement of the AC input prior to conversion and a DC voltage sensed from an output node of the boost circuit, and to process the received AC input and the received DC voltage to control PFC, and wherein the processor sets the PFC setpoint to the first value when the measured AC input is less than a threshold and to the second value when the measured AC input is greater than or equal to the threshold.

7. The system of claim 6 further comprising a rectifier operable to perform the conversion of the AC input to the first DC input.

8. The system of claim 7 wherein the processor continuously adjusts a duty cycle of a signal used to control the boost circuit based on the AC input and the PFC setpoint.

9. The system of claim 6 wherein the boost circuit is configured as a boost converter having:
an inductor, diode and capacitor connected in series;
second and third resistors connected in parallel with the capacitor;
a second switch connected between the inductor and diode and in parallel with the capacitor, the second switch being controlled by the processor to perform switching required to generate the second and third DC outputs with PFC; and
wherein the first switch connects the first resistor in parallel with the third resistor.

10. The system of claim 6 wherein the processor sets as duty cycle of the second switch based on an AC input from which the first DC inputs is generated and the PFC setpoint.

11. A method of controlling a dual voltage power conversion system having a processor, a boost circuit and a voltage scaling circuit, the boost circuit operable to convert a first DC input to one of a second DC output and a third DC output, the first DC input resulting from a conversion of an AC input, and the voltage scaling circuit operable to a first state to set a first voltage scale value and a second state to set a second voltage scale value, the method comprising:
controlling power factor correction (PFC) based on a direct measurement of the AC input prior to conversion and on a sensed DC voltage from an output node of the boost circuit;
operating the voltage scaling circuit to set the first voltage scale value when the second DC output is desired and to set the second voltage scale value when the third DC output is desired, wherein the set voltage scale is based on the direct measurement of the AC input prior to conversion;
issuing from the processor a signal to open or close a switch used to connect a resistive element to the voltage scaling circuit, connection of the resistive element controlling whether the voltage scaling circuit is in the first state and the second state; and
controlling the boost circuit to output one of the second DC output and the third DC output with PFC managed based at least in part on the set voltage scale.

12. The method of claim 11 further comprising setting a duty cycle of a signal used to control the boost circuit based on the AC input and the voltage scale.

13. The method of claim 11 further comprising closing the switch when an AC input rectified to the first DC input is less than a threshold.

14. The method of claim 13 further comprising opening the switch when an AC input rectified to the first DC input is greater than or equal to the threshold.

* * * * *